US007551756B2

(12) United States Patent
Chupeau et al.

(10) Patent No.: US 7,551,756 B2
(45) Date of Patent: Jun. 23, 2009

(54) PROCESS AND DEVICE FOR DETECTING FACES IN A COLOUR IMAGE

(75) Inventors: Bertrand Chupeau, Rennes (FR); Vincent Tollu, Choisy le Roy (FR); Jürgen Stauder, Montreuil/Ille (FR); Lionel Oisel, Pleumeleuc (FR)

(73) Assignee: Thomson Licensing, Boulogne-Billancourt (FR)

( * ) Notice: Subject to any disclaimer, the term of this patent is extended or adjusted under 35 U.S.C. 154(b) by 867 days.

(21) Appl. No.: 10/887,973

(22) Filed: Jul. 8, 2004

(65) Prior Publication Data

US 2005/0041868 A1 Feb. 24, 2005

(30) Foreign Application Priority Data

Jul. 8, 2003 (FR) ................................. 03 08359

(51) Int. Cl.
*G06K 9/00* (2006.01)
*G06K 9/62* (2006.01)
*A61B 1/04* (2006.01)

(52) U.S. Cl. .................. 382/118; 382/128; 382/159; 382/181; 348/77

(58) Field of Classification Search .............. 382/118, 382/260, 128–132, 159–165, 168–181, 190; 348/77, 78
See application file for complete search history.

(56) References Cited

U.S. PATENT DOCUMENTS

| 5,012,522 | A | * | 4/1991 | Lambert ..................... 382/118 |
| 5,164,992 | A | * | 11/1992 | Turk et al. .................. 382/118 |
| 5,430,809 | A | * | 7/1995 | Tomitaka .................... 382/173 |
| 5,659,625 | A | * | 8/1997 | Marquardt .................. 382/118 |
| 5,781,650 | A | * | 7/1998 | Lobo et al. .................. 382/118 |
| 6,670,963 | B2 | * | 12/2003 | Osberger .................... 345/629 |
| 7,343,028 | B2 | * | 3/2008 | Ioffe et al. .................. 382/118 |

OTHER PUBLICATIONS

Christophe Garcia and Georgios Tziritas, "Face Detection Using Quantized Skin Color Regions Merging and Wavelet Packet Analysis", 1999, IEEE Transactions on Multimedia, vol. 1, No. 3, pp. 264-277.*
Min-Hsuan Yang and Narendra Ahuja, "Detecting Human Faces in Color Images" 1998, IEEE Proceedings, International Conference on Image Processing, pp. 127-130.*

(Continued)

*Primary Examiner*—Matthew C Bella
*Assistant Examiner*—Manav Seth
(74) *Attorney, Agent, or Firm*—Robert D. Shedd; Joseph J. Opalach

(57) ABSTRACT

The invention relates to a device and a process for detecting faces in a colour image. The process is such that it comprises the steps of:

detection of the flesh coloured pixels in the image, segmentation of the image into regions of homogeneous colour, selection, among the regions of homogeneous colour, of the regions comprising a number of flesh coloured pixels greater than a first predetermined threshold, the regions selected being said to be flesh coloured regions.

merging of the neighbouring flesh coloured regions until the merge cost attains a second predetermined threshold, the merge cost linearly weighting a merge cost relating to the shape of the regions and a merge cost relating to the colour of the regions, exclusion of false positives.

8 Claims, 2 Drawing Sheets

OTHER PUBLICATIONS

B. Chupeau et al.: "Human Face Detection for Automatic Classification and Annotation of Personal Photo Collections", Proceedings of the SPIE, SPIE, Bellingham, VA. US, vol. 5150, Jul. 8, 2003, pp. 1848-1856.

Yang Min-Hsuang et al: "Detecting human faces in color images" Image Processing, 1998, ICIP 98. Proceedings. 1998 Int'l Conference on Chicago, IL. USA Oct. 4-7, 1998, Los Alamitos, CA, USA, IEEE Comput. Soc. US, Oct. 4, 1998, pp. 127-130.

C. Garcia et al: "Face detection using quantized skin color regions merging and wavelet packet analysis", IEEE Trans. Multimed. USA, IEEE Tranactions on Multimedia, Sep. 1999, vol. 1, No. 3, Sep. 1999, pp. 264-277.

M. Kapfer et al: "Detection of human faces in color image sequences with arbitrary motions for very low bit-rate videophone coding", Pattern Recognition Letters, North-Holland Publ. Amsterdam, NL, vol. 18, No. 14, Dec. 1, 1997, pp. 1503-1518.

Y. Dai et al: "Face-texture model based on SGLD and its application in face detection in a color scene" Pattern Recognition, Pergamon Press Inc., Elmsford, NY, US, vol. 29, No. 6, Jun. 1, 1006, pp. 1007-1017.

H. Schneiderman et al: "A statistical method for 3D object detection applied to faces and cars", 2000, Los Alamitos, CA, USA, IEEE Comput, Soc, USA, Sep. 2001, pp. 746-751.

E, Hjelmas et al: "Face Detection: A Survey", Computer Vision and Image Understanding, Academic Press, San Diego, CA, US, vol. 83, No. 3, Sep. 2001, pp. 236-274.

Search Report dated May 19, 2004.

\* cited by examiner

PROCESS AND DEVICE FOR DETECTING FACES IN A COLOUR IMAGE

The invention relates to a device and a method for detecting faces in an image. This application claims the benefit, under 35 U.S.C. §119 of French Patent Application 0308359, filed July 8, 2003.

BACKGROUND OF THE INVENTION

Face detection is a problem which arises in many video applications and especially in image indexing systems and in video-telephony systems in order to improve the quality of transmission.

Moreover, the detection of faces is a preliminary to their automatic recognition. The recognition of faces having progressed greatly over recent years, detection is becoming ever more expected.

In a multimedia context, a technique coupling detection and recognition of faces would allow thorough enquiries regarding bases of personal photos by making it possible to find all the photos in which such and such a person appears for example.

Such a technique would also be very useful to cinematographic or television companies in order to automatically archive videos on the basis of subtle criteria.

More simply, an algorithm for detecting faces makes it possible to class personal photos into several categories; no face, with 1 face, with a few faces, etc.

Two types of approach exist for the problem of the detection of faces: model based approaches and appearance based approaches.

The model approaches seek to define in a simple manner the object sought, in terms of silhouette, colour, variation of light, texture, etc. The drawback of these methods is that it is difficult to define an object in terms of rules. If the rules adopted are too strict, objects that are only slightly outside the norm are not detected. Conversely, if the rules are too vague, the system detects many unwanted objects.

The appearance approaches rely however on nonparametric decision methods (or classifiers) such as neural networks. The rules defining the object to be detected are not clearly decreed, but they are learnt over a learning set. Measurements are made on the images, the descriptors (average colour, colours of the pixels, wavelet transform, etc.). The classifier then weights the descriptors of the learning set so as to define what is the object to be detected. The rules are then statistical averages over the descriptors.

The principle of such solutions is to partition the input image into small pieces and to submit each of these pieces to a classifier which decides whether such and such a piece is a face. The problem is to decide the size that the said pieces should have. In an image of identity photo type or in a group photo, the faces do not have absolutely the same size. It is then necessary to do a multi-resolution partitioning on every input image, that is to say each quarter of the image, then each eighth, etc. will be submitted to the classifier. This is what makes such systems very greedy in terms of calculation time.

BRIEF SUMMARY OF THE INVENTION

The invention proposes a simple method consisting in using a fairly flexible model to give a reduced candidate set to a nonparametric decision system making it possible to dispense with the multi-resolution partitioning.

To this end, the invention proposes a process for detecting faces in an image, the image being composed of a plurality of pixels.

According to the invention, the process comprises the steps of detection of the flesh coloured pixels in the image, segmentation of the image into regions of homogeneous colour, selection, among the regions of homogeneous colour, of the regions comprising a number of flesh coloured pixels greater than a first predetermined threshold, the regions selected being said to be flesh coloured regions, merging of the neighbouring flesh coloured regions until the merge cost attains a second predetermined threshold, the merge cost linearly weighting a merge cost relating to the shape of the regions and a merge cost relating to the colour of the regions, exclusion of false positives.

By performing the segmentation of the image on the input image and not on the probability map obtained on completion of the step of detection of the flesh coloured pixels, better accuracy can be made possible within limits.

Moreover, the calculation of the merge cost being based both on the shape and on the colour of the regions allows a fast and effective approach to the regions that are potential candidates as faces.

According to a preferred embodiment, the merge step comprises the substeps of calculation of the merge cost relating to the colour of the regions by calculating the mean difference in colour between neighbouring regions, calculation of the merge cost relating to the shape by calculating the overlap between the area of the region and the area of an ellipse having the same centre of gravity as the said region and overlapping it best, the elliptic nature of each region by calculation of the ratio of the sum of the number of pixels of the region outside the ellipse and of the number of pixels of the ellipse outside the region to the number of pixels of the ellipse.

the difference between the maximum of the measures of elliptic nature of the two neighbouring regions and the measure of elliptic nature of the merged region.

Preferentially, the step of detection of the flesh coloured pixels consists in defining a face colour model in the form of a two-dimensional Gaussian probability law in a chrominance plane.

According to a preferred embodiment, the step of excluding false positives consists in comparing the properties of the merged regions with certain properties of a face and in excluding the regions whose properties are too far from those of a face.

According to a preferred embodiment, the properties are chosen among the size of the region, the shape of the region, the average colour, the variance of the luminance along the major axis and any combination of these properties.

According to a preferred embodiment, the step of excluding false positives includes the substeps of calculation of at least one visual descriptor with regard to the merged regions, determination of an optimal hyperplane in the space of descriptors between example images comprising a face and example images not comprising any face, exclusion of the regions whose descriptor does not lie on the correct side of the hyperplane.

Advantageously, the descriptor is calculated by performing a wavelet transformation of a minimal rectangle encompassing the merged ellipse and by assigning to the descriptor the variance of the wavelet coefficients in twelve detail images obtained by hierarchical decomposition of the image.

The invention also relates to a device for detecting faces in an image, the image being composed of a plurality of pixels. According to the invention the device comprises:

means of detection of the flesh coloured pixels in the image, means of segmentation of the image into regions of homogeneous colour, means of selection, among the regions of homogeneous colour, of the regions comprising a number of flesh coloured pixels greater than a first predetermined threshold, the regions selected being said to be flesh coloured regions, means of merging of the neighbouring flesh coloured regions until the merge cost attains a second predetermined threshold, the merge cost linearly weighting a merge cost relating to the shape of the regions and a merge cost relating to the colour of the regions, means of excluding false positives.

The invention also concerns a computer program product including program code instructions for the execution of the steps of the process for detecting faces according to one of claims 1 to 7, when the said program is executed on a computer.

The invention will be better understood and illustrated by means of wholly nonlimiting advantageous exemplary embodiments and modes of implementation, with reference to the appended figures in which:

DETAILED DESCRIPTION OF THE INVENTION

The process comprises a step of detection of the flesh coloured pixels in the image.

The colour space used is the space (Y, Cb, Cr) which separates a luminance component Y from two components describing the blue (Cb) and red (Cr) colours.

Whatever the ethnic group of a human, the colour of his or her skin lies in a precise portion of the chrominance plane.

Several methods may be proposed for constructing a model of colour of skin.

Figure 1:
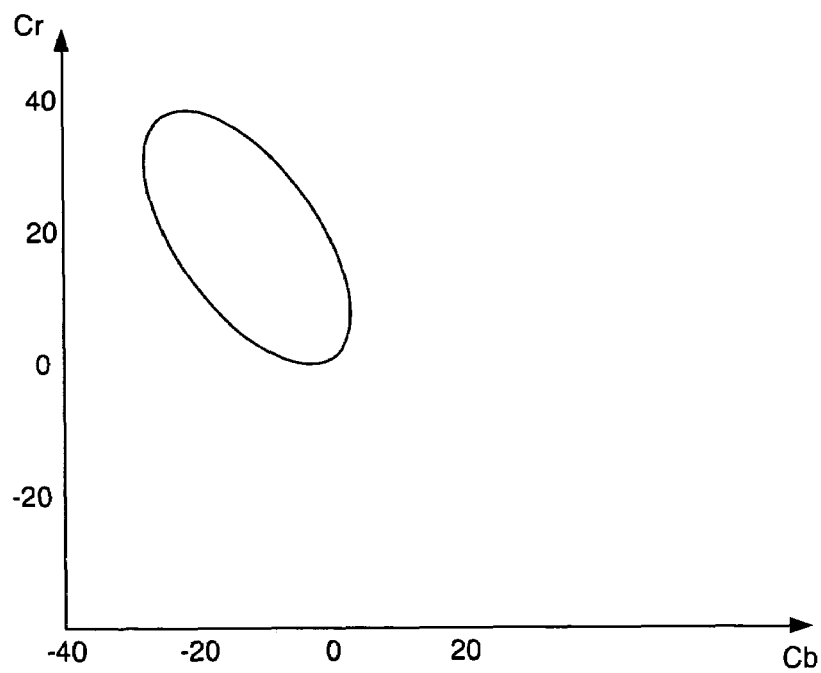
FIG. 1 represents the flesh colour probability law in the plane (Cb, Cr).

In the preferred embodiment, in accordance with the assumption that the colour of skin lies in a specific plane of the chrominance plane, we define a model of colour of skin in the form of a two-dimensional Gaussian probability law in the chrominance plane (Cb, Cr) according FIG. 1. The parameters of this Gaussian probability law are determined by training.

In other embodiments, it is possible to base oneself on nonparametric approaches. A pixel being classed as having a flesh colour if the colour histogram h(r,g), r representing the colour red and g representing the colour green, is greater than a threshold selected empirically on the basis of example faces.

When the flesh coloured pixels are identified, the image is segmented into regions so as to identify regions of homogeneous colour, rather than pixels.

Several segmentation processes may be applied.

The segmentation is performed on the input image and not on the probability map obtained on completion of the step of detection of the flesh coloured pixels. This makes it possible in particular to obtain better accuracy at the boundaries.

The segmentation may be performed by clustering the pixels with regard to a criterion of colour homogeneity or by contour detection, using methods known to the person skilled in the art.

Thus, a first step determines the flesh coloured pixels and a second step, that may possibly be performed in parallel with the first step, segments the input image into regions of homogeneous colours.

Thereafter, on completion of these two steps, the regions for which a certain percentage (for example more than half) of their pixels are of flesh colour are said to be "flesh coloured regions" and are kept for the rest of the search for faces.

When regions have been detected as being of flesh colour, it is desirable to take into account the shape of these regions.

The starting assumption is that a face is rather elliptic in shape.

The next step consists therefore in favouring the merging of macro flesh coloured regions of elliptic shape.

Preferably, this step consists in applying a process of merging of regions RSST (acronym standing for "recursive shortest spanning tree"). The document "utilization of the recursive shortest spanning tree algorithm for video-object segmentation by 2-D affine motion modeling" by Ertem Tuncel and Levent Onutal published in the document IEEE transaction CSVT, volume 10, 2000 illustrates such a merging process.

The list of the links between neighbouring regions is updated and sorted by increasing merge cost. The two regions whose merge cost is the lowest are merged iteratively until a predetermined maximum merge cost is attained.

The merging takes into account the colour and shape information.

A cost function C linearly weighting a merge cost relating to the colour $C_{colour}$ and a merge cost relating to the shape $C_{shape}$ is applied:

$$C = \alpha c_c \times C_{colour} + \alpha_f \times C_{shape}$$

The weight $\alpha_f$ given to the shape is for example double the weight given to the colour $\alpha_c$.

The merge cost computed with regard to the colour is obtained by computing the mean difference in colour between the mergeable regions. In this way, the merged region possesses a homogeneity of colour.

In the equation hereinbelow, $(\overline{Y}_1, \overline{Cb}_1, \overline{Cr}_1)$ and $(\overline{Y}_2, \overline{Cb}_2, \overline{Cr}_2)$ are the vectors of average colour in the space YCbCr of two neighbouring and hence mergeable regions R1 and R2. The denominator is there to normalize the cost between the values 0 and 1, if the colour components are coded between 0 and 255.

$$C_{colour} = \frac{1}{3*255^2}\left[(\overline{Y}_1 - \overline{Y}_2) + (\overline{Cb}_1 - \overline{Cb}_2)^2 + (\overline{Cr}_1 - \overline{Cr}_2)^2\right]$$

To define the merge cost relating to the shape, we first define a measure of elliptic nature over the regions.

Figure 2:
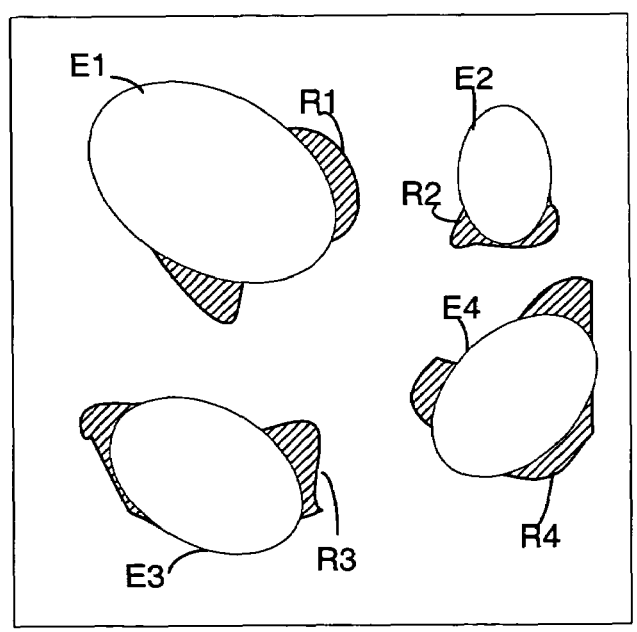
FIGS. 2, 3 and 4 illustrate principles of the invention.

For this purpose, we determine as indicated in FIG. 2, the characteristics of an ellipse having the same centre of gravity as the region. This ellipse has an area at least equal to the surface of the region and overlaps it best. The so-called "method of moments" known to the person skilled in the art may, by way of illustration, be used to determine this ellipse.

With each region $R_i$ is associated an ellipse $E_i$.

We determine thus the elliptic nature $E_{ri}$ of the region $R_i$ by measuring the mutual overlap of the region and of its associated ellipse: all the points of the region outside the ellipse as well as all the points inside the ellipse outside the region are counted and their sum is normalized by the area of the ellipse; the larger this value, the less elliptic the region.

The merge cost relating to the shape of two neighbouring regions $R_1$ and $R_2$ is the difference between the minimum of the measures of elliptic nature of the two mergeable regions $E_{r1}$ and $E_{r2}$ and the measure of elliptic nature of the merged region R1∪R2. This cost is all the smaller when the merged region is more elliptic than its parts. The merge cost relating to the shape may for example be given by the following formula:

$$C_{shape} = \frac{1}{2}(1 + \text{Min}(Er_1, Er_2) - E_{r_1 \cup r_2})$$

On completion of this step, there are a certain number of flesh coloured regions of elliptic shape which are candidates to be faces.

Among these regions, some are not faces and are called "false positives". It is therefore important to exclude these regions.

Several methods of excluding false positives exist.

Two methods are described, a method based on a parametric approach and a method based on the training of a classifier.

Parametric Approach

Various properties of the flesh coloured merged regions of elliptic shape are measured.

These properties are common to faces.

We may mention:
the shape should not be either too large or too small, or too stretched,
the major axis is not too far from the vertical,
the average colour is flesh
the variance of the luminance along the major axis is not too great.

In other embodiments, other parameters may be taken into account.

Training-based Approach.

In this alternative, we calculate visual descriptors for each of the candidate ellipses.

A supervised classifier makes it possible to distinguish faces from non-faces.

In the preferred embodiment, a classifier of "SVM" type (signifying "support vector machine") is used.

This classifier determines, in the course of a training phase in which it is provided with a base of examples and of counterexamples, an optimal hyperplane in the space of descriptors, between faces and non-faces. This training phase is performed off-line. Once this training phase has been performed, the classifier is capable of deciding in real time whether a candidat emanating from the detection phase described above is a face ou a non-face.

In other embodiments, classifiers of k-means type ou neural networks may be used.

Several descriptors may be used.

Figure 3:
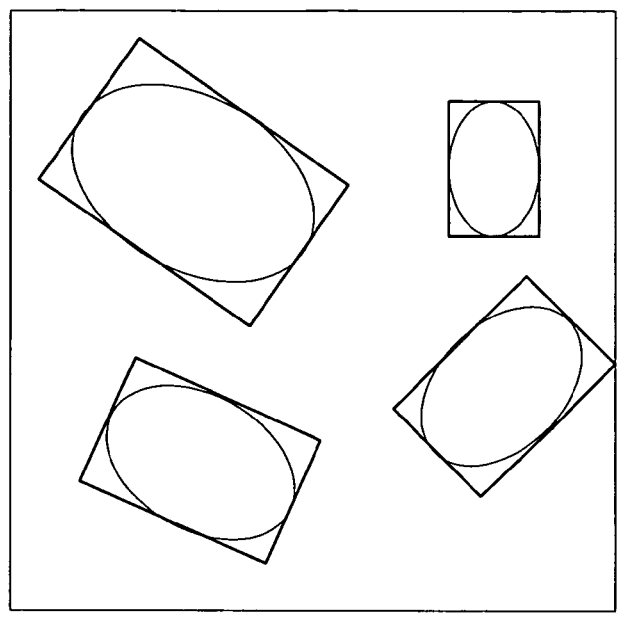

In the preferred embodiment the descriptor used emanates from the wavelet transformation (ou subband transformation) of a rectangle which encompasses the candidate ellipse detected in the preceding step as being a candidate as indicated in FIG. 3.

Figure 4:
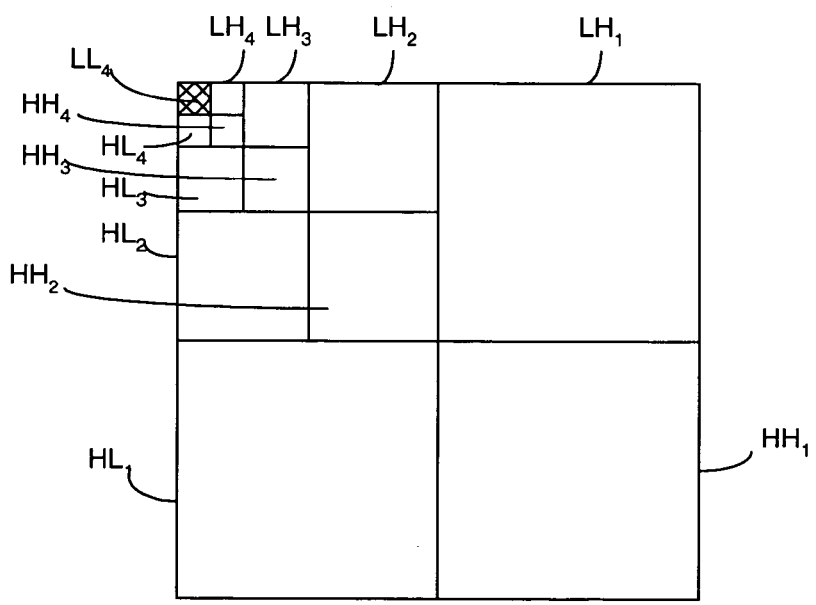

The descriptor emanates from the variance of the wavelet coefficients in the 12 detail images obtained by hierarchical decomposition of the image as indicated in FIG. 4, the twelve detail images being the detail images represented with the exclusion of the hatched region.

The circuit for decomposing the images into subbands is a set of filters which filter the image in both directions into low and high frequency subbands.

The circuit comprises four successive levels of decomposition for decomposing the image into subbands according to four levels of resolution.

Subband $LL_1$ comprises the components ou coefficients of low frequency in both directions of the image signal. Subband $LH_1$, comprises the low frequency coefficients in a first direction and high frequency coefficients in the other direction. Subband $HL_1$, comprises the high frequency coefficients in the first direction and low frequency coefficients in the second direction. Finally, subband $HH_1$, comprises the high frequency coefficients in both directions.

Subband $LL_1$ is thereafter decomposed according to the same principle as described hereinabove into subbands $LL_2$, $LH_2$, $HL_2$, $HH_2$.

Subband $LL_2$ is thereafter decomposed according to the same principle as described hereinabove into subbands $LL_3$, $LH_3$, $HL_3$, $HH_3$.

Subband $LL_3$ is thereafter decomposed according to the same principle as described hereinabove into subbands $LL_4$, $LH_4$, $HL_4$, $HH_4$.

This descriptor makes it possible to capture the particular properties of texture of faces.

In other embodiments, a descriptor representing the variance of the luminance along the major axis of the ellipse may be used.

The invention claimed is:

1. Process for use in a device for detecting faces in an image, the image being composed of a plurality of pixels, comprising the steps of:
   using a processor, to perform the steps of:
   detecting the flesh coloured pixels in the image,
   segmenting the image into regions of homogeneous colour,
   selecting, among the regions of homogeneous colour, of the regions comprising a number of flesh coloured pixels greater than a first predetermined threshold, the regions selected being said to be flesh coloured regions,
   merging of the neighbouring flesh coloured regions until the merge cost attains a second predetermined threshold, the merge cost linearly weighting a merge cost relating to the shape of the regions and a merge cost relating to the colour of the regions, and
   excluding false positives,
   wherein the merge step comprises the substeps of
   calculating the merge cost relating to the colour of the regions by calculating the mean difference in colour between neighbouring regions, and
   calculating the merge cost relating to the shape by calculating the overlap between the area of the region and the area of an ellipse having the same centre of gravity as the said region and overlapping it best,
   the elliptic nature of each region by calculation of the ratio of the sum of the number of pixels of the region outside the ellipse and of the number of pixels of the ellipse outside the region to the number of pixels of the ellipse, and the difference between the minimum of the measures of elliptic nature of the two neighbouring regions and the measure of elliptic nature of the merged region.

2. Process according to claim 1 wherein the step of detection of the flesh coloured pixels consists in defining a face colour model in the form of a two-dimensional Gaussian probability law in a chrominance plane.

3. Process according to claim 1 wherein the step of excluding false positives consists in comparing the properties of the merged regions with certain properties of a face and in excluding the regions whose properties are too far from those of a face.

4. Process according to claim 3 wherein the properties are chosen among
the size of the region,
the shape of the region,
the average colour,
the variance of the luminance along the major axis and any combination of these properties.

5. Process according to claim 1 wherein the step of excluding false positives includes the substeps of
calculating at least one visual descriptor with regard to the merged regions,
determining an optimal hyperplane in the space of descriptors between example images comprising a face and example images not comprising any face,
excluding the regions whose descriptor does not lie on the correct side of the hyperplane.

6. Process according to claim 5 wherein the descriptor is calculated by the steps of:
performing a wavelet transformation of a minimal rectangle encompassing the merged regions, and
calculating the descriptor as the variance of the wavelet coefficients in twelve detail images obtained by hierarchical decomposition of the image.

7. Device for detecting faces in an image, the image being composed of a plurality of pixels, wherein it comprises:
means for detection of the flesh coloured pixels in the image,
means for segmentation of the image into regions of homogeneous colour,
means for selection, among the regions of homogeneous colour, of the regions comprising a number of flesh coloured pixels greater than a first predetermined threshold, the regions selected being said to be flesh coloured regions,
means for merging of the neighbouring flesh coloured regions until the merge cost attains a second predetermined threshold, the merge cost linearly weighting a merge cost relating to the shape of the regions and a merge cost relating to the colour of the regions,
means for excluding false positives,
wherein the means for merging
calculates the merge cost relating to the colour of the regions by calculating the mean difference in colour between neighbouring regions, and
calculates the merge cost relating to the shape by calculating
the overlap between the area of the region and the area of an ellipse having the same centre of gravity as the said region and overlapping it best,
the elliptic nature of each region by calculation of the ratio of the sum of the number of pixels of the region outside the ellipse and of the number of pixels of the ellipse outside the region to the number of pixels of the ellipse, and
the difference between the minimum of the measures of elliptic nature of the two neighbouring regions and the measure of elliptic nature of the merged region.

8. A computer readable medium encoded with a computer program for detecting faces in an image, the image being composed of a plurality of pixels, the computer program comprising the steps of:
detecting the flesh coloured pixels in the image,
segmenting the image into regions of homogeneous colour,
selecting, among the regions of homogeneous colour, of the regions comprising a number of flesh coloured pixels greater than a first predetermined threshold, the regions selected being said to be flesh coloured regions,
merging of the neighbouring flesh coloured regions until the merge cost attains a second predetermined threshold, the merge cost linearly weighting a merge cost relating to the shape of the regions and a merge cost relating to the colour of the regions, and
excluding false positives,
wherein the merge step comprises the substeps of
calculating the merge cost relating to the colour of the regions by calculating the mean difference in colour between neighbouring regions,
calculating the merge cost relating to the shape by calculating
the overlap between the area of the region and the area of an ellipse having the same centre of gravity as the said region and overlapping it best,
the elliptic nature of each region by calculation of the ratio of the sum of the number of pixels of the region outside the ellipse and of the number of pixels of the ellipse outside the region to the number of pixels of the ellipse, and
the difference between the minimum of the measures of elliptic nature of the two neighbouring regions and the measure of elliptic nature of the merged region.

* * * * *